(12) United States Patent
Ouyang et al.

(10) Patent No.: US 12,117,947 B2
(45) Date of Patent: Oct. 15, 2024

(54) INFORMATION PROCESSING METHOD, PHYSICAL MACHINE, AND PCIE DEVICE

(71) Applicant: HUAWEI TECHNOLOGIES CO., LTD., Guangdong (CN)

(72) Inventors: Changchun Ouyang, Shanghai (CN); Shui Cao, Shanghai (CN); Zihao Xiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/205,090

(22) Filed: Mar. 18, 2021

(65) Prior Publication Data
US 2021/0224210 A1    Jul. 22, 2021

Related U.S. Application Data

(63) Continuation of application No. PCT/CN2020/098722, filed on Jun. 29, 2020.

(30) Foreign Application Priority Data

Jul. 31, 2019  (CN) .......................... 201910703910.9

(51) Int. Cl.
*G06F 13/28*     (2006.01)
*G06F 3/06*      (2006.01)
(Continued)

(52) U.S. Cl.
CPC ............ *G06F 13/28* (2013.01); *G06F 9/4411* (2013.01); *G06F 9/45558* (2013.01);
(Continued)

(58) Field of Classification Search
CPC ...... G06F 13/28; G06F 3/0647; G06F 9/4411; G06F 9/45558; G06F 9/544;
(Continued)

(56) References Cited

U.S. PATENT DOCUMENTS 9,361,145 B1   6/2016  Wilson et al.
9,450,885 B2   9/2016  Johnsen et al.
(Continued)

FOREIGN PATENT DOCUMENTS

CN   103201721 A    7/2013
CN   103890728 B   12/2015
(Continued)

OTHER PUBLICATIONS

PCT International Search Report and Written Opinion in International Application No. PCT/CN2020/098722, dated Oct. 12, 2020, 13 pages.

(Continued)

*Primary Examiner* — David E Martinez
(74) *Attorney, Agent, or Firm* — Fish & Richardson P.C.

(57) ABSTRACT

The present disclosure relates to information processing methods, physical machines, and peripheral component interconnect express (PCIE) devices. In one example method, a PCIE device receives, in a live migration process of a to-be-migrated virtual machine (VM), a packet corresponding to the to-be-migrated VM, where the to-be-migrated VM is one of a plurality of VMs. The PCIE device determines a direct memory access (DMA) address based on the packet. The PCIE device sends the DMA address to a physical function (PF) driver.

20 Claims, 8 Drawing Sheets

(51) Int. Cl.
    *G06F 9/4401* (2018.01)
    *G06F 9/455* (2018.01)
    *G06F 9/54* (2006.01)

(52) U.S. Cl.
    CPC ...... *G06F 9/544* (2013.01); *G06F 2009/4557* (2013.01); *G06F 2009/45583* (2013.01); *G06F 2213/0026* (2013.01)

(58) Field of Classification Search
    CPC ... G06F 2009/4557; G06F 2009/45583; G06F 2213/0026; G06F 2313/0026
    See application file for complete search history.

(56) References Cited

U.S. PATENT DOCUMENTS

| | | | |
|---|---|---|---|
| 10,198,299 B1* | 2/2019 | Xu | G06F 13/28 |
| 11,126,575 B1* | 9/2021 | Aslanidis | G06F 13/24 |
| 2011/0246686 A1* | 10/2011 | Cavanagh, Jr. | G06F 13/28 710/22 |
| 2012/0179855 A1* | 7/2012 | Tsirkin | G06F 9/45558 711/6 |
| 2015/0169418 A1* | 6/2015 | Cardona | G06F 11/1658 714/4.11 |
| 2015/0193248 A1* | 7/2015 | Noel | G06F 9/45558 718/1 |
| 2015/0293873 A1* | 10/2015 | Shao | G06F 13/4221 710/314 |
| 2016/0132443 A1 | 5/2016 | Davda et al. | |
| 2016/0139944 A1* | 5/2016 | Rouwet | G06F 9/45558 718/1 |
| 2016/0283421 A1* | 9/2016 | Wilson | G06F 13/28 |
| 2019/0146853 A1* | 5/2019 | Xu | G06F 9/45558 710/308 |
| 2021/0165675 A1* | 6/2021 | Wang | G06F 9/45558 |

FOREIGN PATENT DOCUMENTS

| | | |
|---|---|---|
| CN | 105677480 A | 6/2016 |
| CN | 106648826 A | 5/2017 |
| CN | 105612498 B | 3/2018 |
| CN | 108205506 A | 6/2018 |
| CN | 108874506 A | 11/2018 |
| CN | 110879741 A | 3/2020 |

OTHER PUBLICATIONS

Extended European Search Report issued in European Application No. 20846569.0 on Aug. 26, 2022, 10 pages.

Xu et al., "SRVM: Hypervisor Support for Live Migration with Passthrough SR-IOV Network Devices," ACM SIGPLAN Notices, Mar. 2016, 13 pages.

* cited by examiner

INFORMATION PROCESSING METHOD, PHYSICAL MACHINE, AND PCIE DEVICE

CROSS-REFERENCE TO RELATED APPLICATIONS

This application is a continuation of International Application No. PCT/CN2020/098722, filed on Jun. 29, 2020, which claims priority to Chinese Patent Application No. 201910703910.9, filed on Jul. 31, 2019. The disclosures of the aforementioned applications are hereby incorporated by reference in their entireties.

TECHNICAL FIELD

This application relates to the computer field, and in particular, to an information processing method, a physical machine, and a PCIE device.

BACKGROUND

In a typical virtual machine application architecture, a virtual machine manager (VMM) having a virtual machine management function is installed on a physical machine, the VMM manages one or more virtual machines VMs, and an operating system (OS) and various applications may run on each VM. Hardware of the physical machine mainly includes: some hardware related to virtual machine running, for example, a central processing unit (CPU), a memory, and a hard disk; and some hardware that is not directly used to run a virtual machine but is used to execute some particular services and that has relatively independent functions, for example, a peripheral component interconnect express (PCIE) device (such as a network adapter or a graphics card) in the physical machine.

Single-root I/O virtualization (SR-IOV) is an input/output (I/O) virtualization technology. With the technology, a plurality of virtual PCIE adapters, referred to as virtual functions (VF), may be obtained through virtualization on one PCIE device. The VF can perform a direct memory access (DMA) operation on a physical machine memory to implement data exchange between the PCIE device and a VM.

After implementing virtualization, the physical machine may implement live migration of a virtual machine by using a host. A virtual machine live migration technology means that a virtual machine is migrated from one host to another host through live migration. A live migration process may include dirty logging of to-be-migrated data and migration of dirty data by the host.

That the VF can directly perform the DMA operation on the physical machine memory means that the VF may directly transfer data to a physical machine memory page corresponding to a DMA address. The data also needs to be migrated in a live migration process of the VM. However, because the VF can complete the DMA operation without the host, the host cannot obtain the DMA address of the physical machine memory in which the data that needs to be migrated is located. Consequently, in the live migration process, the host cannot implement dirty logging and live migration of the data.

SUMMARY

This application provides an information processing method, in which a PCIE device records a DMA address, and sends the DMA address to a PF driver in a host, so that the host can obtain the DMA address and perform dirty logging and live migration based on the DMA address.

According to a first aspect, this application provides an information processing method used in a physical machine. A peripheral component interconnect express PCIE device is disposed on the physical machine, and at least one virtual machine VM including a first virtual machine VM, a physical function PF driver configured to manage the PCIE device, and a virtual machine manager VMM run in the physical machine. The method includes: The PCIE device receives, in a live migration process of the first VM, a packet sent to the first VM. The PCIE device determines, based on the packet, a direct memory access DMA address corresponding to the first VM. The PCIE device transfers the DMA address to the PF driver. The PF driver generates a dirty bit used to indicate the DMA address. The PF driver writes the dirty bit into a dirty bitmap, so that the VMM obtains the dirty bitmap, where the dirty bitmap is used to store an address of data that needs to be migrated in the live migration process of the first VM.

In the foregoing manner, the PCIE device records the DMA address, and sends the DMA address to the PF driver in a host, so that the host can obtain the DMA address, and perform dirty logging and live migration based on the DMA address.

In addition, compared with a solution in which the VMM directly obtains the DMA address corresponding to the virtual machine VM without the PCIE device and then monitors whether a memory modification action is performed in a memory space corresponding to the DMA address, which causes excessively high CPU overheads of the physical machine because the DMA address corresponding to the virtual machine VM may change in real time (in other words, the DMA address that the VM is authorized to use may change dynamically) but the VMM needs to obtain in real time the DMA address corresponding to the virtual machine VM, in this embodiment of this application, because the PCIE device may learn a change of the DMA address corresponding to the VM (a VF driver corresponding to the VM sends the DMA address corresponding to the VM to the PCIE device), the PCIE device may directly send the DMA address to the host, thereby reducing CPU overheads of the physical machine.

In an optional design of the first aspect, that the PCIE device transfers the DMA address to the PF driver includes: The PCIE device writes the DMA address into a buffer of a receive queue of the PF driver. The PCIE device sends a first interrupt to the PF driver, where the first interrupt is used to indicate the PF driver to read the buffer of the receive queue.

In an optional design of the first aspect, that the PCIE device transfers the DMA address to the PF driver includes: The PCIE device writes the DMA address into a mailbox. The PCIE device sends a second interrupt to the PF driver, where the second interrupt is used to indicate the PF driver to read the mailbox to obtain the DMA address.

In this way, compared with a solution in which the VMM directly obtains the DMA address corresponding to the virtual machine VM without the PCIE device and then monitors whether a memory modification action is performed in a memory space corresponding to the DMA address, and marks a corresponding DMA address when a memory modification action is performed, which requires the VMM to occupy a large block of contiguous memory in a CPU, in this embodiment of this application, the PCIE device sends the DMA address to the PF driver of the host through the receive queue or the mailbox, which does not need to occupy a large block of contiguous memory in the CPU because a size of the buffer of the receive queue and a size of the mailbox are controllable and memories occupied by buffers of the receive queue are discrete.

In an optional design of the first aspect, that the PCIE device determines, based on the packet, a direct memory access DMA address corresponding to the first VM includes: The PCIE device obtains, based on the packet, N DMA addresses from L DMA addresses corresponding to the first VM, where the L DMA addresses and the N DMA addresses belong to a same group of memory pages, and N is less than L. Correspondingly, that the PCIE device transfers the DMA address to the PF driver includes: The PCIE device transfers the N DMA addresses to the PF driver.

In this embodiment of this application, after determining the L DMA addresses corresponding to the packet, a data processing unit screens the L DMA addresses, and retains only the N DMA addresses while ensuring that each memory page corresponds to at least one DMA address. In other words, it is ensured that the DMA addresses obtained after the screening can also indicate all memory pages corresponding to the DMA addresses obtained before the screening, thereby reducing resource occupation.

In an optional design of the first aspect, the PCIE device further includes at least one virtual function VF. In live migration of the first VM, the first VM corresponds to a first VF in the at least one VF. The method further includes: The PF driver sends a function identifier of the first virtual function VF to the PCIE device. The PCIE device determines the first VM based on the function identifier of the first VF. In this way, the PCIE device may learn that the first VM requires live migration, and then send, after receiving the packet sent to the first VM, the DMA address corresponding to the first VM to the PF driver in the host.

In an optional design of the first aspect, the dirty bitmap includes a first dirty bitmap and a second dirty bitmap. The first dirty bitmap is writable, and the second dirty, bitmap is readable. That the PF driver writes the dirty bit into a dirty bitmap includes: The PF driver writes the dirty bit into the first dirty bitmap. The PF driver changes the first dirty bitmap to readable, so that the VMM obtains the written dirty bit from the first dirty bitmap.

In an optional design of the first aspect, after the PF driver changes the first dirty bitmap to readable, the method further includes: The PF driver changes the second dirty bitmap to writable, so that the PF driver writes information. In this way, maximum access concurrency of dirty bitmap reading and writing can be ensured by using a dual-dirty bitmap reading and writing mechanism.

In an optional design of the first aspect, after the VMM obtains the written dirty bit from the first dirty bitmap, the method further includes: The PF driver clears the first dirty bitmap.

According to a second aspect, this application provides an information processing method used in a PCIE device. The PCIE device is disposed on a physical machine, a host and at least one virtual machine VM including a first virtual machine VM run in the physical machine. The host includes a physical function PF driver configured to manage the PCIE device. The method includes: receiving, in a live migration process of the first VM, a packet sent to the first VM; determining, based on the packet, a direct memory access DMA address corresponding to the first VM; and transferring the DMA address to the PF driver for processing by the host.

In an optional design of the second aspect, the transferring the DMA address to the PF driver includes: writing the DMA address into a buffer of a receive queue of the PF driver; and sending a first interrupt to the PF driver, where the first interrupt is used to indicate the PF driver to receive the buffer of the receive queue.

In an optional design of the second aspect, the transferring the DMA address to the PF driver includes:
 writing the DMA address into a mailbox; and
 sending a second interrupt to the PF driver, where the second interrupt is used to indicate the PF driver to read the mailbox to obtain the DMA address.

In an optional design of the second aspect, the determining, based on the packet, a direct memory access DMA address corresponding to the first VM includes:
 obtaining, based on the packet, N DMA addresses from L DMA addresses corresponding to the first VM, where the L DMA addresses and the N DMA addresses belong to a same group of memory pages, and N is less than L; and
 correspondingly, the transferring the DMA address to the PF driver includes:
 transferring the N DMA addresses to the PF driver.

In an optional design of the second aspect, the PCIE device further includes at least one virtual function VF. In live migration of the first VM, the first VM corresponds to a first VF in the at least one VF. The method further includes:
 receiving a function identifier, of the first VF, that is sent by the PF driver; and
 determining, by the PCIE device, the first VM based on the function identifier of the first VF.

According to a third aspect, this application provides an information processing method used in a PF driver. The PF driver runs in a physical machine. A peripheral component interconnect express PCIE device is disposed on the physical machine. At least one virtual machine VM including a first virtual machine VM and a virtual machine manager VMM also run in the physical machine. The method includes:
 receiving, in a live migration process of the first VM, a DMA address transferred by the PCIE device, where the DMA address corresponds to the first VM;
 generating a dirty bit used to indicate the DMA address; and
 writing the dirty bit into a dirty bitmap, so that the VMM obtains the dirty bitmap, where the dirty bitmap is used to store an address of data that needs to be migrated in the live migration process of the first VM.

In an optional design of the third aspect, the receiving a DMA address transferred by the PCIE device includes:
 receiving a first interrupt sent by the PCIE device; and
 reading a buffer of a receive queue based on the first interrupt, where the DMA address is written into the buffer.

In an optional design of the third aspect, the receiving a DMA address transferred by the PCIE device includes:
 receiving a second interrupt sent by the PCIE device; and
 reading a mailbox based on the second interrupt to obtain the DMA address, where the DMA address is written into the mailbox.

In an optional design of the third aspect, the PCIE device further includes at least one virtual function VF. In live migration of the first VM the first VM corresponds to a first VF in the at least one VF. The method further includes:
 sending a function identifier of the first virtual function VF to the PCIE device, so that the PCIE device determines the first VM based on the function identifier of the first VF.

In an optional design of the third aspect, the dirty bitmap includes a first dirty bitmap and a second dirty bitmap. The first dirty bitmap is writable, and the second dirty bitmap is readable. The writing the dirty bit into a dirty bitmap includes:

writing the dirty bit into the first dirty bitmap; and
  changing the first dirty bitmap to readable, so that the VMM obtains the written dirty bit from the first dirty bitmap.

In an optional design of the third aspect, after the changing the first dirty bitmap to readable, the method further includes: changing the second dirty bitmap to writable, to write information.

In an optional design of the third aspect, after the VMM obtains the written dirty bit from the first dirty bitmap, the method further includes:

clearing the first dirty bitmap.

According to a fourth aspect, this application provides a physical machine. A peripheral component interconnect express PCIE device is disposed on the physical machine, and at least one virtual machine VM including a first virtual machine VM, a physical function PF driver configured to manage the PCIE device, and a virtual machine manager VMM run in the physical machine.

In a live migration process of the first VM, the PCIE device is configured to receive a packet sent to the first VM, determine, based on the packet, a direct memory access DMA address corresponding to the first VM, and transfer the DMA address to the PF driver.

The PF driver is configured to: generate a dirty bit used to indicate the DMA address; and write the dirty bit into a dirty bitmap, so that the VMM obtains the dirty bitmap, where the dirty bitmap is used to store an address of data that needs to be migrated in the live migration process of the first VM.

In an optional design of the fourth aspect, the PCIE device is configured to:

write the DMA address into a buffer of a receive queue of the PF driver, and send a first interrupt to the PF driver, where the first interrupt is used to indicate the PF driver to read the buffer of the receive queue.

In an optional design of the fourth aspect, the PCIE device is configured to:

write the DMA address into a mailbox, and send a second interrupt to the PF driver, where the second interrupt is used to indicate the PF driver to read the mailbox to obtain the DMA address.

In an optional design of the fourth aspect, the PCIE device is configured to:

obtain, based on the packet, N DMA addresses from L DMA addresses corresponding to the first VM, where the L DMA addresses and the N DMA addresses belong to a same group of memory pages, and N is less than L; and
  transfer the N DMA addresses to the PF driver.

In an optional design of the fourth aspect, the PCIE device further includes at least one virtual function VF. In live migration of the first VM, the first VM corresponds to a first VF in the at least one VF. The PF driver is further configured to send a function identifier of the first virtual function VF to the PCIE device.

The PCIE device is further configured to determine the first VM based on the function identifier of the first VF.

In an optional design of the fourth aspect, the dirty bitmap includes a first dirty bitmap and a second dirty bitmap. The first dirty bitmap is writable, and the second dirty bitmap is readable. The PF driver is configured to:

write the dirty bit into the first dirty bitmap; and
  change the first dirty bitmap to readable, so that the VMM obtains the written dirty bit from the first dirty bitmap.

In an optional design of the fourth aspect, the PF driver is further configured to change the second dirty bitmap to writable, so that the PF driver writes information.

In an optional design of the fourth aspect, the PF driver is further configured to clear the first dirty bitmap.

According to a fifth aspect, this application provides a peripheral component interconnect express PCIE device. The PCIE device is disposed on a physical machine. A host and at least one virtual machine VM including a first virtual machine VM run in the physical machine. The host includes a physical function PF driver configured to manage the PCIE device. The PCIE device includes:

a transceiver module, configured to receive, in a live migration process of the first VM, a packet sent to the first VM; and
  a processing module, configured to determine, based on the packet, a direct memory access DMA address corresponding to the first VM.

The transceiver module is further configured to transfer the DMA address to the PF driver for processing by the host.

In an optional design of the fifth aspect, the transceiver module is configured to:

write the DMA address into a buffer of a receive queue of the PF driver; and
  send a first interrupt to the PF driver, where the first interrupt is used to indicate the PF driver to receive the buffer of the receive queue.

In an optional design of the fifth aspect, the transceiver module is configured to:

write the DMA address into a mailbox; and
  send a second interrupt to the PF driver, where the second interrupt is used to indicate the PF driver to read the mailbox to obtain the DMA address.

In an optional design of the fifth aspect, the processing module is further configured to: obtain, based on the packet, N DMA addresses from L DMA addresses corresponding to the first VM, where the L DMA addresses and the N DMA addresses belong to a same group of memory pages, and N is less than L.

The transceiver module is configured to:
  transfer the N DMA addresses to the PF driver.

In an optional design of the fifth aspect, the PCIE device further includes at least one virtual function VF, and in live migration of the first VM, the first VM corresponds to a first VF in the at least one VF. The transceiver module is further configured to: receive a function identifier, of the first VF, that is sent by the PF driver.

The processing module is further configured to determine the first VM based on the function identifier of the first VF.

According to a sixth aspect, this application provides a host. The host runs in a physical machine, a peripheral component interconnect express PCIE device is disposed on the physical machine, and at least one virtual machine VM including a first virtual machine VM and a virtual machine manager VMM also run in the physical machine. The host includes:

a transceiver module, configured to receive, in a live migration process of the first VM, a DMA address transferred by the PCIE device, where the DMA address corresponds to the first VM; and generate a dirty bit used to indicate the DMA address; and
  a processing module, configured to write the dirty bit into a dirty bitmap, so that the VMM obtains the dirty bitmap, where the dirty bitmap is used to store an address of data that needs to be migrated in the live migration process of the first VM.

In an optional design of the sixth aspect, the transceiver module is configured to: receive a first interrupt sent by the PCIE device, and read a buffer of a receive queue based on the first interrupt, where the DMA address is written into the buffer.

In an optional design of the sixth aspect, the transceiver module is configured to: receive a second interrupt sent by the PCIE device, and read a mailbox based on the second interrupt to obtain the DMA address, where the DMA address is written into the mailbox.

In an optional design of the sixth aspect, the PCIE device further includes at least one virtual function VF, in live migration of the first VM, the first VM corresponds to a first VF in the at least one VF, and the transceiver module is further configured to: send a function identifier of the first virtual function VF to the PCIE device, so that the PCIE device determines the first VM based on the function identifier of the first VF.

In an optional design of the sixth aspect, the dirty bitmap includes a first dirty bitmap and a second dirty bitmap, the first dirty bitmap is writable, and the second dirty bitmap is readable. The processing module is further configured to:
write the dirty bit into the first dirty bitmap, and change the first dirty bitmap to readable, so that the VMM obtains the written dirty bit from the first dirty bitmap.

In an optional design of the sixth aspect, the processing module is further configured to: change the second dirty bitmap to writable, to write information.

In an optional design of the sixth aspect, the processing module is further configured to: clear the first dirty bitmap.

According to a seventh aspect, this application provides a communication device, including a processor, a memory, and a PCIE device.

The processor, the memory, and the PCIE device are electrically connected.

The processor is configured to run a PF driver based on code in the memory,
to enable the PF driver and the PCIE device to perform the method according to any one of the first aspect or the possible implementations of the first aspect.

According to an eighth aspect, this application provides a communication device, including a processor and a memory.

The processor and the memory are electrically connected.

The processor is configured to perform, based on code in the memory, the method according to any one of the third aspect or the possible implementations of the third aspect.

It can be learned from the foregoing technical solutions that the embodiments of this application have the following advantages:

This application provides an information processing method, including: receiving, by the PCIE device in a live migration process of the to-be-migrated virtual machine, a packet corresponding to a to-be-migrated VM, where the to-be-migrated VM is one of the plurality of VMs; determining, by the PCIE device, a direct memory access DMA address based on the packet; and sending, by the PCIE device, the DMA address to the PF driver. In the foregoing manner, the PCIE device records the DMA address, and sends the DMA address to the PF driver in the host, so that the host can obtain the DMA address, and perform dirty logging and live migration based on the DMA address.

DESCRIPTION OF EMBODIMENTS

The following describes the technical solutions in the embodiments of this application with reference to the accompanying drawings in the embodiments of this application. Apparently, the described embodiments are merely a part rather than all of the embodiments of this application. A person of ordinary skill in the art may learn that, with development of technologies and emergence of new scenarios, the technical solutions provided in the embodiments of this application are also applicable to similar technical problems.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device. Naming or numbering of steps in this application does not mean that steps in a method procedure need to be performed according to a time/logical sequence indicated by the naming or the numbering. An execution sequence of steps in a procedure that have been named or numbered may be changed according to a technical objective to be achieved, provided that a same or similar technical effect can be achieved.

Figure 1:
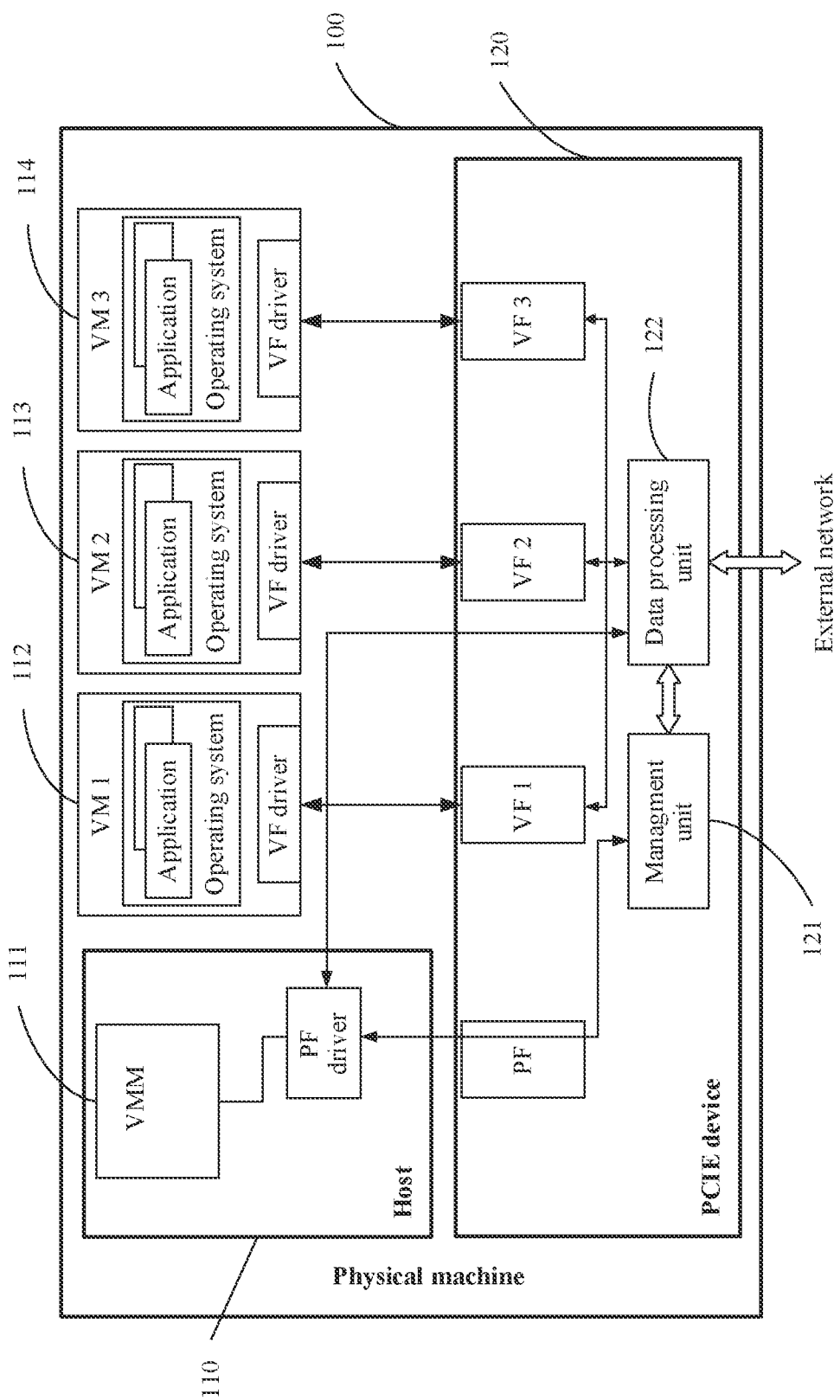
FIG. 1 is a schematic diagram of an application architecture according to an embodiment of the present invention.

For ease of description of the embodiments, the following first briefly describes an application scenario of the embodiments of the present invention. FIG. 1 is a schematic diagram of an application architecture according to an embodiment of the present invention. This embodiment of the present invention may be used in a physical machine 100. A host 110, a peripheral component interconnect express (PCIE) device 120, and at least one virtual machine (VM) (namely, virtual machines VM 1 to VM 3 (112 to 114)

shown in FIG. 1, where it should be noted that a quantity of virtual machines does not limit embodiments of the present invention, and may be adjusted at any time based on a requirement in an actual application, and the three virtual machines are listed herein only for ease of description) may run in the physical machine 100.

A VMM 111 runs on the host 110. The VMM 111 may manage one or more virtual machines VMs. An operating system and various applications running in the operating system may run on each virtual machine VM. It should be understood that, in some scenarios, the virtual machine manager VMM in this embodiment may implement some or all functions of a virtual machine monitor (VMM).

In a specific implementation process, the virtual machine manager VMM may be implemented by a customized logic chip, and is responsible for virtual machine management and control, including completing operations such as monitoring and modifying an attribute and a state of a virtual machine, and creating, migrating, powering on, and powering off the virtual machine.

Although not shown in FIG. 1, the host 110 further includes hardware related to virtual machine VM running, for example, a central processing unit (CPU) and a memory (a hard disk, a memory, and the like) of at least one computer-readable storage medium. In addition, the host 110 may further include a communication unit, an input unit, a display unit, and the like.

The host 110 may be connected to the PCIE device 120. The PCIE device 120 is a hardware device that supports a single-root input/output virtualization SR-IOV standard. The PCIE device 120 includes at least one physical function (PF) and at least one virtual function VF. For ease of description, FIG. 1 shows only one PF and three VFs (VF 1, VF 2, and VF 3). Unique function identifiers function ids are configured for the PF and the VF. Each PF or VF corresponds to a virtual machine VM, and a correspondence between a function identifier function id of the PF or the VF and the virtual machine VM may be stored in a management unit 121 and a data processing unit 122 of the PCIE device 120. The data processing unit 122 may be a virtual switch L2vSwitch.

A PF driver for managing the PCIE device 120 also runs on the host 110 (the PF driver may directly access all resources of the PF, and is responsible for configuring and managing all the VFs). A VF driver runs in each virtual machine VM to manage a corresponding VF. It should be noted that, a binding relationship between each virtual machine and the VF is not unchangeable, and this embodiment is merely intended to describe a one-to-one correspondence between each virtual machine VM and each VF, for example, VM 1 corresponds to VF 1.

Each VM may directly exchange, based on a DMA operation without the VMM, network I/O data with one or more VFs corresponding to the VM, which reduces I/O performance overheads in the VMM while ensuring I/O throughput efficiency of each VM. Specifically, when receiving a data packet from and sending a data packet to the VF, the virtual machine VM may implement complete independence of receiving and sending with reference to an input/output memory management unit (IOMMU) technology provided by the CPU. The VMM 111 does not perceive a process in which the VF writes a data packet into a physical machine memory page corresponding to the DMA address.

In this embodiment of this application, the VF driver of each virtual machine VM may obtain a DMA address that the virtual machine VM is authorized to use. The DMA address is a memory address in the physical machine memory. The VF driver may send the DMA address to the data processing unit 122 by using a corresponding VF. Therefore, the data processing unit 122 may store a correspondence between each virtual machine VM and a DMA address. It should be noted that, the correspondence between each virtual machine VM and a DMA address may be understood as a DMA address that each VM is authorized to use. When sending a packet to the VM through a DMA operation, the VF may write the packet into a physical machine memory page corresponding to a DMA address that the VM is authorized to use. For example, a VF driver of the virtual machine VM 1 is connected to VF 1, and the VF driver of the virtual machine VM 1 obtains a DMA address that the virtual machine VM 1 is authorized to use, and transfers the DMA address that the virtual machine VM 1 is authorized to use to the data processing unit 122 through VF 1. Correspondingly, the data processing unit 122 may store the DMA address that the virtual machine VM 1 is authorized to use.

In addition, the data processing unit 122 further maintains a correspondence between each VF and a VM. When the data processing unit 122 in the PCIE device 120 receives a packet (a source of the packet may be an external network, or may be a VM in the physical machine), the data processing unit 122 may determine, based on a destination address of the packet, a VM to which the packet needs to be sent, and determine, based on a correspondence between a VF and a VM, a VF corresponding to the VM, to transfer the packet to the corresponding VF, so that the VF may initiate a DMA operation based on a correspondence between a VM and a DMA address, and write the packet into a physical machine memory page corresponding to the DMA address that the VM is authorized to use, and correspondingly, the VM may obtain the packet from the physical machine memory page corresponding to the DMA address that the VM is authorized to use.

It should be noted that the foregoing device types and connection manners are merely examples, and are not limited in the present invention.

Figure 2:
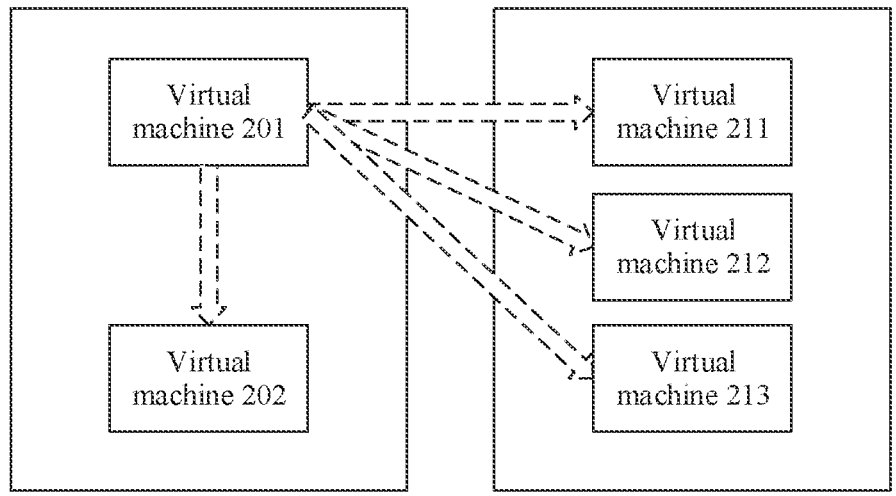
FIG. 2 is a schematic diagram of a migration architecture of virtual machine live migration.

In an application scenario, when a VM needs to be maintained, a running state of the VM may be stored completely and restored on another platform, to perform virtual machine live migration. For example, FIG. 2 is a schematic diagram of a migration architecture of virtual machine live migration. When a virtual machine 201 in FIG. 2 needs to be maintained, a running state of the virtual machine 201 may be migrated to another virtual machine 202 on a same physical machine or migrated to a virtual machine 211, 212, or 213 on another physical machine.

In an actual scenario, the physical machine may be a server that provides various cloud services.

After the server is virtualized, virtual machine VM live migration can be easily implemented. The key to virtual machine VM live migration is memory migration. Generally, memory migration of a virtual machine VM may be divided into three phases:

1. Iterative pre-copy phase: After a migration process of a virtual machine VM is started, the virtual machine VM still runs on a source server, and a service of the virtual machine VM is not interrupted. First, a host copies all in-memory data of the virtual machine VM to a destination server, and then the host performs dirty logging on changed in-memory data in the virtual machine VM, and keeps iteratively copying the dirty in-memory data to the destination server. When an amount of in-memory data that needs to be copied is less than a specific threshold after some iterations, a stop-and-copy phase starts.

It should be noted that the foregoing steps implemented by the host may be implemented by a VMM in the host.

2. Stop-and-copy phase: The virtual machine VM is shut down, the service is interrupted, and residual in-memory data of the VM is copied.

3. Restoration phase: Restoration processing before running is completed for a destination virtual machine VM, and the destination virtual machine VM is started, to complete the entire migration process.

It can be learned that, in the live migration process of the VM, the host needs to perform dirty logging and migration on the data to be migrated.

However, in a scenario in which an SR-IOV technology is used, a VF can directly perform a DMA operation on a physical machine memory. In other words, the VF can directly transfer data to a physical machine memory page corresponding to a DMA address. The data also needs to be migrated in a live migration process of a VM. However, because the VF can complete the DMA operation without a host, the host cannot obtain the DMA address, in the physical machine memory, of the data that needs to be migrated. Consequently, in the live migration process, the host cannot implement dirty logging or live migration of the data.

Figure 3A:
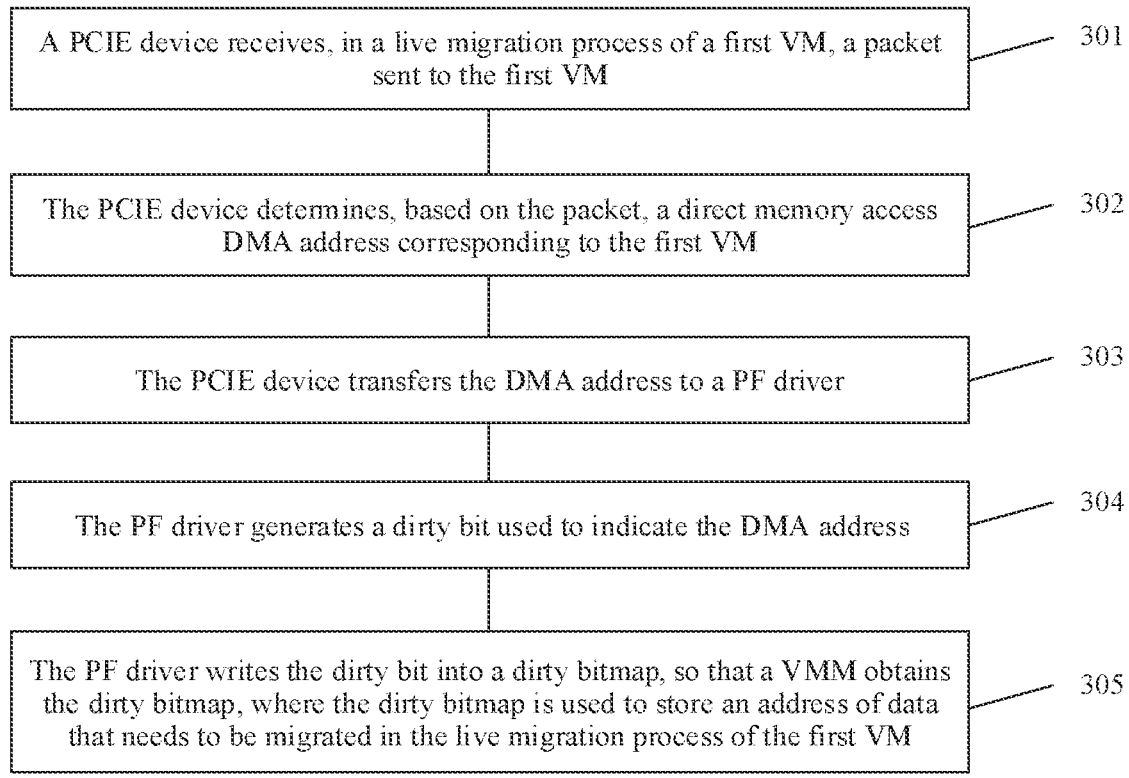
FIG. 3a is a schematic flowchart of an information processing method according to an embodiment of this application.

To resolve the foregoing problem, this application provides an information processing method. The information processing method is used in a physical machine, a peripheral component interconnect express PCIE device is disposed on the physical machine, and at least one virtual machine VM including a first virtual machine VM, a physical function PF driver configured to manage the PCIE device, and a virtual machine manager VMM run in the physical machine. FIG. 3a is a schematic flowchart of an information processing method according to an embodiment of this application. As shown in FIG. 3, the information processing method provided in this embodiment includes the following steps.

301: The PCIE device receives, in a live migration process of the first VM, a packet sent to the first VM.

In this embodiment of this application, in a DMA configuration phase, a VF driver may send, to the PCIE device, a DMA address that a corresponding virtual machine VM is authorized to use (in other words, a DMA address corresponding to a VM). A data processing unit in the PCIE device may receive the DMA address sent by the VF driver. Correspondingly, the PCIE device may store a correspondence between each virtual machine VM and a DMA address. Because the PCIE device further stores a correspondence between a VF and each virtual machine VM, the PCIE device may store a correspondence between a VF and a DMA address.

In an embodiment, the PCIE device may maintain a plurality of function tables, each function table corresponds to a VF, and the function table records a correspondence between the VF, a virtual machine VM, and a DMA address. Optionally, in this embodiment of this application, both a management unit and the data processing unit of the PCIE device may maintain the function tables.

In this embodiment of this application, before virtual machine live migration is performed, the PF driver of a host may initialize a communication channel between the PF driver and the management unit in the PCIE device, that is, apply for a channel resource for communication between the PF driver and the management unit.

Optionally, in an embodiment, the PF driver may apply for memory resources of a plurality of receive queues RQs (receive queue), as a data transmission link to the data processing unit in the PCIE device. Specifically, a receive queue RQ may include a plurality of elements, and each element may correspond to a buffer. Optionally, the PF driver may preconfigure a quantity of the elements included in the receive queue RQ and a size of the buffer corresponding to each element.

It should be noted that each of the plurality of receive queues RQs may uniquely correspond to a queue identifier.

In this embodiment of this application, the PF driver may deliver a function identifier function id of a to-be-migrated VF and a queue identifier of a receive queue RQ to the management unit. Then, the management unit may determine the corresponding VF based on the received identifier of the VF, determine that a VM corresponding to the VF is a VM (the first VM) that requires live migration, mark a memory dirty logging state of the VF as requiring memory dirty logging, and bind the VF and the received queue identifier of the receive queue RQ. Specifically, the management unit may determine a corresponding function table based on the function identifier function id of the VF, mark a field in the function table as requiring memory dirty logging, and store the corresponding queue identifier of the receive queue RQ in the function table.

It should be noted that the function identifier function id of the VF may be used to distinguish between different VFs. Herein, the function identifier function id may include a bus number and a device number. This is not limited in this application.

Optionally, in an embodiment, the PF driver may communicate with the PCIE device by using a doorbell and mailbox mechanism. Specifically, the PF driver may apply for a mailbox buffer and a door bell register for the PCIE device to implement communication between the PF driver and the PCIE device. In other words, a mailbox buffer and a door bell register are configured in a PF for the PCIE device to implement a mechanism similar to "door bell knocking". If the PCIE device needs to send a packet, the PCIE device directly sends data to the mailbox buffer in the PF, and sends a second interrupt to the PF driver. After receiving the second interrupt, the PF driver may read the mailbox buffer corresponding to the second interrupt.

In this embodiment of this application, the PCIE device may receive a function identifier of a first virtual function VF that is sent by the host, and determine the first VM based on the function identifier of the first VF.

In this embodiment of this application, the PCIE device may receive a packet sent to the first VM. The packet may be sent from an external network, or may be sent by another VM other than the first VM on the physical machine.

302: The PCIE device determines, based on the packet, a direct memory access DMA address corresponding to the first VM.

In this embodiment of this application, after receiving the packet sent to the first VM, the data processing unit in the PCIE device may determine, based on a destination address in the packet, that a destination VM is the first VM, determine, based on a correspondence between a VM and a VF, a VF corresponding to the first VM, and then read a state marker of the VF. Specifically, a function table corresponding to the VF may be searched for a corresponding field used to indicate a memory dirty logging state of the VF. If the VF is not in the memory dirty logging state, the data processing unit in the PCIE device may normally transfer the packet to a receive queue corresponding to the VF.

In this embodiment of this application, if the data processing unit in the PCIE device reads the state marker of the VF, and determines that the VF is in the memory dirty logging state, the data processing unit obtains a corresponding DMA address from the function table.

Optionally, in an embodiment, the data processing unit may obtain, based on the packet, N DMA addresses from L DMA addresses corresponding to the first VM. The L DMA addresses and the N DMA addresses belong to a same group of memory pages, and N is less than L.

In this embodiment of this application, the data processing unit may determine, in the function table, that the first VM corresponds to L DMA addresses. L is a positive integer greater than or equal to 2.

The virtual machine VM performs memory reading and writing on a memory page. One memory page may correspond to a plurality of DMA addresses. One DMA address corresponds to one memory page.

In this embodiment of this application, the L DMA addresses determined by the data processing unit may be DMA addresses on N memory pages. N is a positive integer less than L.

In this embodiment of this application, the data processing unit may determine N DMA addresses corresponding to the N memory pages. Each of the N memory pages corresponds to at least one of the N DMA addresses.

For example, the data processing unit determines that the DMA addresses corresponding to the packet are {address 1, address 2, address 3, address 4, address 5, address 6, address 7, address 8, address 9, address 10, address 11, address 12, address 13, address 14, address 15}, {address 1, address 2, address 3} are DMA addresses on a memory page 1,
{address 4, address 5} are DMA addresses on a memory page 2,
{address 6, address 7, address 8} are DMA addresses on a memory page 3, and
{address 9, address 10, address 11, address 12, address 13, address 14, address 15} are DMA addresses on a memory page 4.

In this case, the 15 DMA addresses are DMA addresses on four memory pages.

The data processing unit may determine N DMA addresses corresponding to the four memory pages. Each of the four memory pages corresponds to at least one of the N DMA addresses.

For example, the data processing unit may determine four DMA addresses corresponding to the four memory pages: {address 1, address 4, address 6, address 9}. The memory page 1 corresponds to the address 1, the memory page 2 corresponds to the address 4, the memory page 3 corresponds to the address 6, and the memory page 4 corresponds to the address 9.

In an embodiment, a quantity of DMA addresses corresponding to a memory page may be greater than 1. For example, the data processing unit may determine five DMA addresses corresponding to the four memory pages: {address 1, address 2, address 4, address 6, address 9}. The memory page 1 corresponds to the address 1 and the address 2, the memory page 2 corresponds to the address 4, the memory page 3 corresponds to the address 6, and the memory page 4 corresponds to the address 9.

In this embodiment of this application, after determining the L DMA addresses corresponding to the packet, the data processing unit screens the L DMA addresses, and retains only the N DMA addresses while ensuring that each memory page corresponds to at least one DMA address. In other words, it is ensured that the DMA addresses obtained after the screening can also indicate all memory pages corresponding to the DMA addresses obtained before the screening, thereby reducing resource occupation.

303: The PCIE device transfers the DMA address to the PF driver.

In this embodiment of this application, the data processing unit may find, in the function table corresponding to the VF, an identifier of a receive queue RQ bound to the VF, and write the DMA address into a buffer of the receive queue corresponding to the identifier of the receive queue RQ.

Optionally, in an embodiment, the data processing unit may determine a plurality of DMA addresses corresponding to the packet. For a virtual machine VM, one memory page may correspond to a plurality of DMA addresses. In a memory live migration process, migration is performed based on a memory page. Therefore, if the data processing unit determines that a plurality of DMA addresses belonging to a same memory page exist in the plurality of DMAs corresponding to the packet, the data processing unit may send only one of the plurality of DMA addresses in the same memory page to the PF driver. In other words, if the data processing unit determines that a plurality of DMA addresses in a same memory page exist in the plurality of DMAs corresponding to the packet, the data processing unit may write only one of the plurality of DMA addresses belonging to the same memory page into a buffer of the receive queue RQ corresponding to the receive queue identifier.

In this embodiment of this application, after writing the determined DMA address into the buffer of the receive queue, the data processing unit may send a first interrupt to the PF driver. The first interrupt is used to indicate the PF driver to receive the buffer.

Optionally, in an embodiment, the data processing unit may send a first interrupt to the PF driver when determining that at least one of the following preset conditions is met. The preset conditions may include:

1. A buffer is full of DMA addresses.
2. A timeout period expires.
3. A to-be-migrated VF is not in the memory dirty logging state.

In an embodiment, the data processing unit may write the DMA address into a buffer in the receive queue RQ, and the data processing unit may determine in real time whether the determined buffer is full of DMA addresses, and send a first interrupt to the PF driver after determining that the buffer is full of DMA addresses, to indicate the PF driver to receive the buffer of the receive queue.

In an embodiment, the data processing unit may determine one buffer from a plurality of buffers of the receive queue, and write the DMA address into the buffer, and the data processing unit may start timing when performing the first write operation, and send a first interrupt to the PF driver when a preset time is reached, to indicate the PF driver to receive the buffer of the receive queue.

In an embodiment, the data processing unit may monitor in real time the memory dirty logging state of the to-be-migrated VF in the function table corresponding to the to-be-migrated VF, and send a first interrupt to the PF driver if the memory dirty logging state is not requiring memory dirty logging, to indicate the PF driver to receive a buffer of the receive queue.

In an embodiment, the data processing unit may determine one buffer from a plurality of buffers of the receive queue, and write the DMA address into the buffer, and the data processing unit may determine in real time whether the determined buffer is full of DMA addresses, start timing when performing the first write operation, and monitor in real time the memory dirty logging state of the to-be-migrated VF in the function table corresponding to the to-be-migrated VF.

In this embodiment of this application, the data processing unit may send a first interrupt to the PF driver after determining that the buffer is full of DMA addresses. Alternatively, the data processing unit may send a first interrupt to the PF driver when the buffer is not full of DMA addresses but a preset time is reached. Alternatively, the data processing unit may send a first interrupt to the PF driver when the buffer is not full of DMA addresses but it is determined that the to-be-migrated VF is not in the memory dirty logging state. Alternatively, the data processing unit may send a first interrupt to the PF driver when the buffer is not fully written with the DMA address and a preset time is not reached but it is determined that the to-be-migrated VF is not in the memory dirty logging state. The first interrupt may indicate the PF driver to receive the buffer of the receive queue.

Optionally, in an embodiment, the data processing unit may determine a plurality of DMA addresses corresponding to the packet. For a virtual machine VM, one memory page may correspond to a plurality of DMA addresses. In a memory live migration process, migration is performed based on a memory page. Therefore, if the data processing unit determines that a plurality of DMA addresses belonging to a same memory page exist in the plurality of DMAs corresponding to the packet, the data processing unit may send only one of the plurality of DMA addresses in the same memory page to the PF driver. In other words, if the data processing unit determines that a plurality of DMA addresses in a same memory page exist in the plurality of DMAs corresponding to the packet, the data processing unit may write only one of the plurality of DMA addresses belonging to the same memory page into a mailbox.

In this embodiment of this application, after writing the determined DMA address into the mailbox, the data processing unit may send a second interrupt to the PF driver. The second interrupt is used to indicate the PF driver to read the mailbox to obtain the DMA address.

Optionally, in an embodiment, the data processing unit may send a second interrupt to the PF driver when determining that at least one of the following preset conditions is met. The preset conditions may include.

1. A mailbox is full of DMA addresses.
2. A timeout period expires.
3. A to-be-migrated VF is not in the memory dirty logging state.

In an embodiment, the data processing unit may write the DMA address into a mailbox, and the data processing unit may determine in real time whether the mailbox is full of DMA addresses, and send a second interrupt to the PF driver after determining that the mailbox is full of DMA addresses, to indicate the PF driver to read the mailbox to obtain the DMA address.

In an embodiment, the data processing unit may write the DMA address into a mailbox, and the data processing unit may start timing when performing the first write operation, and send a second interrupt to the PF driver when a preset time is reached, to indicate the PF driver to read the mailbox to obtain the DMA address.

In an embodiment, the data processing unit may monitor in real time the memory dirty logging state of the to-be-migrated VF in the function table corresponding to the to-be-migrated VF, and send a second interrupt to the PF driver if the memory dirty logging state is not requiring memory dirty logging, to indicate the PF driver to read the mailbox to obtain the DMA address.

In an embodiment, the data processing unit may write the DMA address into a mailbox, and the data processing unit may determine in real time whether the mailbox is full of DMA addresses, start timing when performing the first write operation, and monitor in real time the memory dirty logging state of the to-be-migrated VF in the function table corresponding to the to-be-migrated VF.

In this embodiment of this application, the data processing unit may send a second interrupt to the PF driver after determining that the mailbox is full of DMA addresses. Alternatively, the data processing unit may send a second interrupt to the PF driver when the mailbox is not full of DMA addresses but a preset time is reached. Alternatively, the data processing unit may send a second interrupt to the PF driver when the mailbox is not full of DMA addresses but it is determined that the to-be-migrated VF is not in the memory dirty logging state. Alternatively, the data processing unit may send a second interrupt to the PF driver when the mailbox is not full of DMA address and a preset time is not reached but it is determined that the to-be-migrated VF is not in the memory dirty logging state. The second interrupt may indicate the PF driver to read the mailbox to obtain the DMA address.

304: The PF driver generates a dirty bit used to indicate the DMA address.

In this embodiment of this application, after obtaining the DMA address, the PF driver may generate a dirty bit used to indicate the DMA address.

305: The PF driver writes the dirty bit into a dirty bitmap, so that the VMM obtains the dirty bitmap, where the dirty bitmap is used to store an address of data that needs to be migrated in the live migration process of the first VM.

In this embodiment of this application, after generating the dirty bit used to indicate the DMA address, the PF driver may write the dirty bit into a dirty bitmap, so that the VMM obtains the dirty bitmap. The dirty bitmap is used to store an address of data that needs to be migrated in the live migration process of the first VM. Correspondingly, the VMM may obtain the dirty bitmap, and perform memory live migration based on the dirty bit in the dirty bitmap.

Optionally, in an embodiment, the PF driver of the host may read the mailbox and obtain the DMA address written into the mailbox, and then the PF driver may convert the DMA address into a dirty bit and write the dirty bit into a dirty bitmap. The VMM of the physical machine may obtain the dirty bitmap, and perform memory live migration based on the dirty bit in the dirty bitmap.

It should be noted that, for how the VMM performs memory live migration based on the dirty bit in the dirty bitmap, refer to an implementation in the prior art. Details are not described herein.

In this embodiment of this application, the PCIE device records the DMA address, and sends the DMA address to the PF driver in the host, so that the host can obtain the DMA address, and perform dirty logging and live migration based on the DMA address.

In addition, compared with a solution in which the VMM directly obtains the DMA address corresponding to the virtual machine VM without the PCIE device and then monitors whether a memory modification action is performed in a memory space corresponding to the DMA address, which causes excessively high CPU overheads of the physical machine because the DMA address corresponding to the virtual machine VM may change in real time (in other words, the DMA address that the VM is authorized to use may change dynamically) but the VMM needs to obtain in real time the DMA address corresponding to the virtual machine VM, in this embodiment of this application, because the PCIE device may learn a change of the DMA address corresponding to the VM (a VF driver corresponding to the VM sends the DMA address corresponding to the VM to the PCIE device), the PCIE device may directly send the DMA address to the host, thereby reducing CPU overheads of the physical machine.

In addition, compared with a solution in which the VMM directly obtains the DMA address corresponding to the virtual machine VM without the PCIE device and then monitors whether a memory modification action is performed in a memory space corresponding to the DMA address, and marks a corresponding DMA address when a memory modification action is performed, which requires the VMM to occupy a large block of contiguous memory in a CPU, in this embodiment of this application, the PCIE device sends the DMA address to the PF driver of the host through the receive queue and the mailbox, which does not need to occupy a large block of contiguous memory in the CPU because a size of the buffer of the receive queue and a size of the mailbox are controllable and memories occupied by buffers of the receive queue are discrete.

Figure 3B:
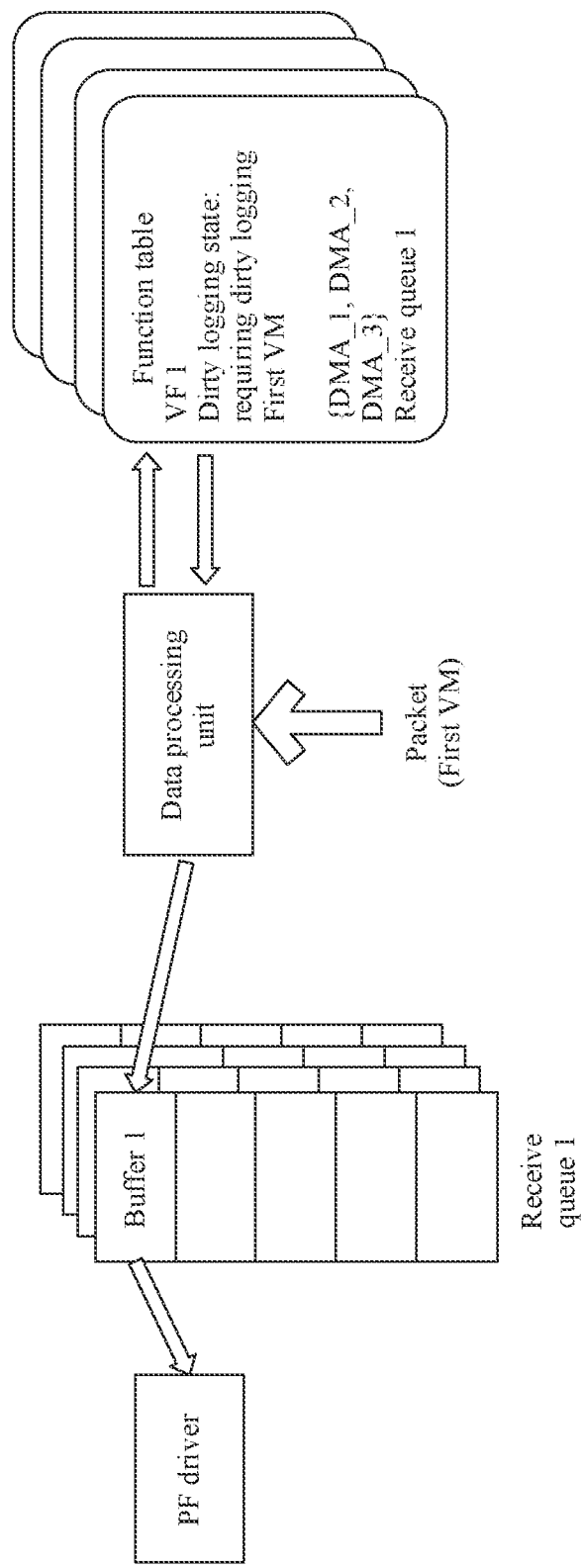
FIG. 3b is a schematic flowchart of DMA address transfer according to an embodiment of this application.

FIG. 3b is a schematic flowchart of DMA address transfer according to an embodiment of this application. As shown in FIG. 3b, after receiving the packet sent to the first VM, the data processing unit may determine the VF corresponding to the first VM and the function table corresponding to the VF. The function table records as follows: the dirty logging state of the VF is requiring dirty logging, the DMA addresses corresponding to the first VM are {DMA_1, DMA_2, DMA_3}, and the receive queue ID bound to the first VM is a receive queue 1.

The data processing unit may select the receive queue 1 from a plurality of receive queues corresponding to a plurality of PF drivers, and write the DMA addresses {DMA_1, DMA_2, DMA_3} corresponding to the first VM into a buffer (buffer 1) of the receive queue 1. Correspondingly, the PF driver may obtain the DMA addresses {DMA_1, DMA_2, DMA_3} corresponding to the first VM from the buffer 1 in the receive queue 1.

This embodiment of this application provides an information processing method, including: receiving, by the PCIE device in a live migration process of the to-be-migrated virtual machine, a packet corresponding to a to-be-migrated VM, where the to-be-migrated VM is one of the plurality of VMs; determining, by the PCIE device, a direct memory access DMA address based on the packet; and sending, by the PCIE device, the DMA address to the PF driver. In the foregoing manner, the PCIE device records the DMA address, and sends the DMA address to the PF driver in the host, so that the host can obtain the DMA address, and perform dirty logging and live migration based on the DMA address.

Figure 4:
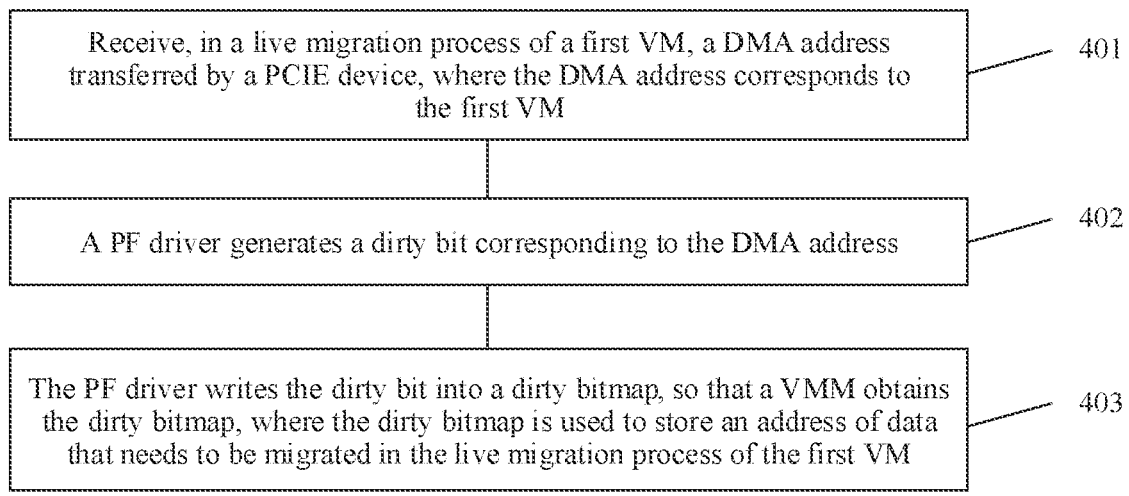
FIG. 4 is a schematic flowchart of another information processing method according to an embodiment of this application.

FIG. 4 is a schematic flowchart of another information processing method according to an embodiment of this application. The information processing method provided in this embodiment may be used in a PF driver, the PF driver runs in a physical machine, a peripheral component interconnect express PCIE device is disposed on the physical machine, at least one virtual machine VM including a first virtual machine VM and a virtual machine manager VMM also run in the physical machine, and the information processing method specifically includes the following steps.

401: Receive, in a live migration process of the first VM, a DMA address transferred by the PCIE device, where the DMA address corresponds to the first VM.

For how the PF driver receives the DMA address transferred by the PCIE device, refer to the description of step 303 in the embodiment corresponding to FIG. 3. Details are not described herein again.

402: The PF driver generates a dirty bit corresponding to the DMA address.

It should be noted that, for how the PF driver generates the dirty bit corresponding to the DMA address, refer to an implementation in the prior art. Details are not described herein.

403: The PF driver writes the dirty bit into a dirty bitmap, so that the VMM obtains the dirty bitmap, where the dirty bitmap is used to store an address of data that needs to be migrated in the live migration process of the first VM.

In this embodiment of this application, the dirty bitmap may include a first dirty bitmap and a second dirty bitmap.

In this embodiment of this application, the PF driver may maintain two dirty bitmaps (the first dirty bitmap and the second dirty bitmap). A read/write attribute of the first dirty bitmap is writable, and a read/write attribute of the second dirty bitmap is readable.

Correspondingly, after generating the dirty bit corresponding to the DMA address, the PF driver may write the dirty bit into the first dirty bitmap.

Figure 5A:
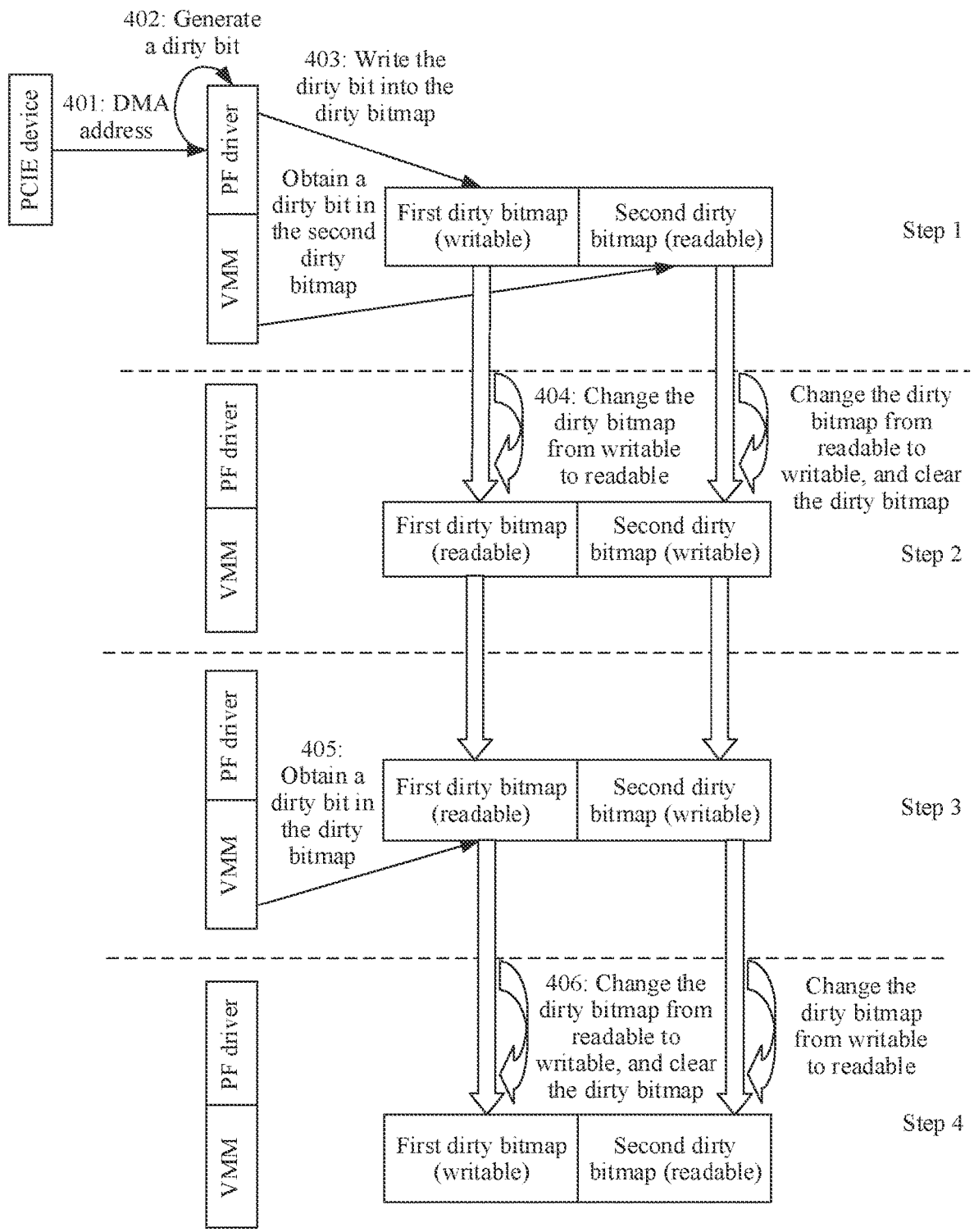
FIG. 5a is a schematic diagram of dirty bitmap reading and writing according to an embodiment of this application.

FIG. 5a is a schematic diagram of dirty bitmap reading and writing according to an embodiment of this application. As shown in FIG. 5a, in a phase of step 1, the read/write attribute of the first dirty bitmap is writable. In this case, if the PF driver obtains a DMA address transferred by the PCIE device, the PF driver may generate a dirty bit corresponding to the DMA address, and write the dirty bit into the first dirty bitmap.

In this embodiment of this application, the VMM may periodically invoke a status synchronization sync interface to obtain a dirty bit in a dirty bitmap whose read/write attribute is readable.

It should be noted that the status synchronization sync interface may be preconfigured. In specific implementation, the status synchronization sync interface may be an interface function configured to implement a receiving function, and code for status synchronization may be executed by invoking the interface function. When configuring the status synchronization sync interface, an interface name may be set for the status synchronization sync interface. For example, a function name may be configured for the function.

As shown in FIG. 5a, in the phase of step 1, the read/write attribute of the first dirty bitmap is writable, and the read/write attribute of the second dirty bitmap is readable. In this case, the VMM may invoke the synchronization sync interface to read a dirty bit in the second dirty bitmap.

After the VMM reads the dirty bit in the second dirty bitmap, in a phase of step 2 shown in FIG. 5a, the PF driver may set the read/write attribute of the first dirty bitmap from writable to readable (404), and set the read/write attribute of the second dirty bitmap from readable to writable, and clear the second dirty bitmap.

In this embodiment of this application, as shown in FIG. 5a, in a phase of step 3, after the PF driver changes the writable attribute of the first dirty bitmap to readable, the VMM may obtain a dirty bit in the first dirty bitmap (405). In the phase of step 3, after the VMM obtains the dirty bit in the first dirty bitmap, the PF driver may change the read/write attribute of the first dirty bitmap from readable to writable (406), and change the read/write attribute of the second dirty bitmap from writable to readable. Correspondingly, in a next phase, the VMM may obtain a dirty bit in the second dirty bitmap.

It should be noted that FIG. 5a shows, only in the phase of step 1, that the PF driver writes the dirty bit into the first dirty bitmap. In an actual application, the PF driver may receive, in real time, a DMA address sent by the PCIE device, generate a dirty bit corresponding to the DMA address, write the dirty bit to a dirty bitmap whose read/write attribute is writable.

Figure 5B:
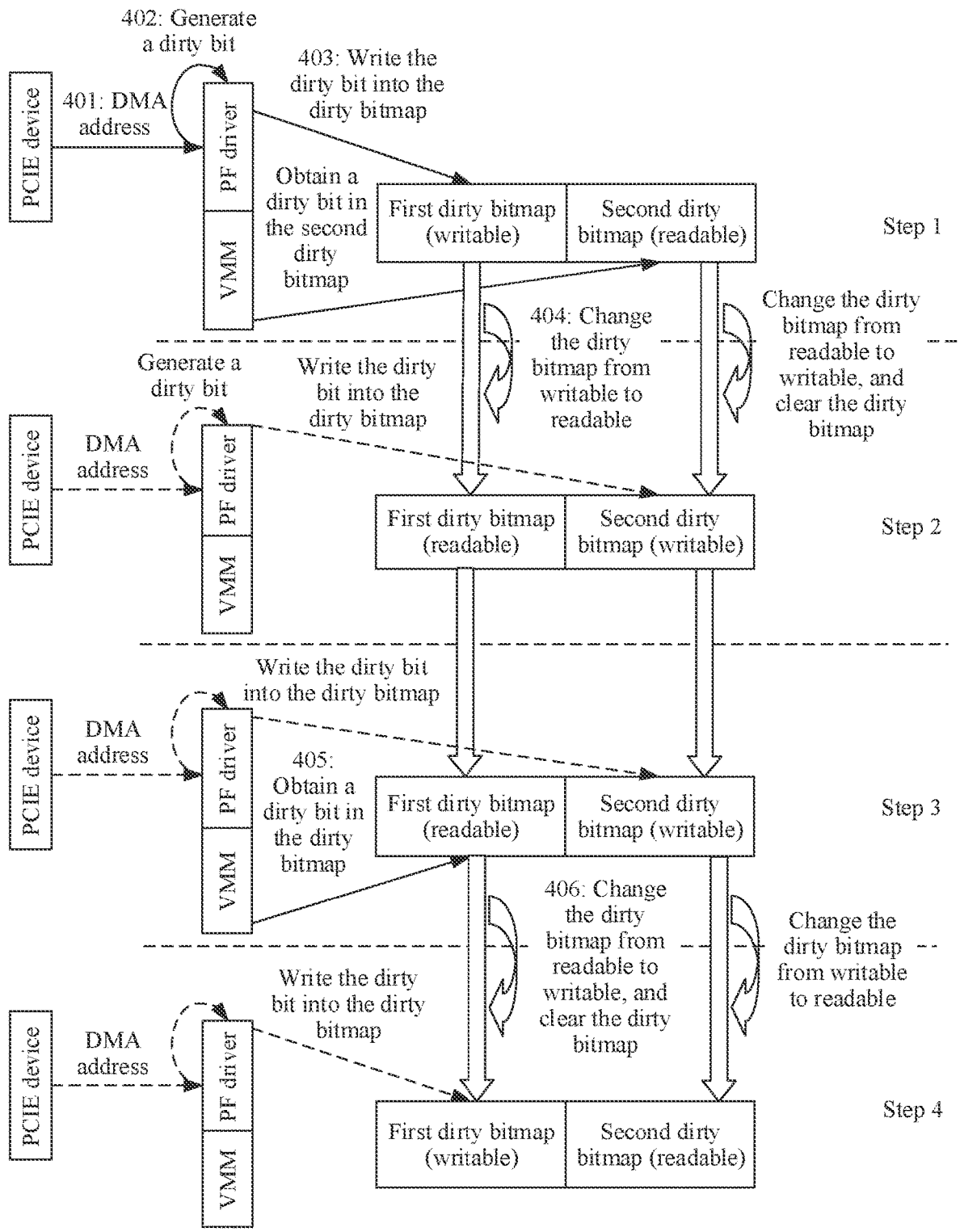
FIG. 5b is a schematic diagram of dirty bitmap reading and writing according to an embodiment of this application.

For example, FIG. 5b is a schematic diagram of dirty bitmap reading and writing according to an embodiment of this application. As shown in FIG. 5b, in a phase of step 2, the PF driver may receive, in real time, a DMA address sent by the PCIE device, generate a dirty bit corresponding to the DMA address, and write the dirty bit into the second dirty bitmap.

In a phase of step 3, the PF driver may receive, in real time, a DMA address sent by the PCIE device, generate a dirty bit corresponding to the DMA address, and write the dirty bit into the second dirty bitmap.

In a phase of step 4, the PF driver may receive, in real time, a DMA address sent by the PCIE device, generate a dirty bit corresponding to the DMA address, and write the dirty bit into the first dirty bitmap.

It should be noted that FIG. 5a and FIG. 5b are merely examples, and do not constitute a limitation on this embodiment of this application.

In this embodiment of this application, the PF driver may apply for two dirty bitmap buffers. A read/write attribute of one buffer is a write attribute, and a read/write attribute of the other buffer is a read attribute. Maximum access concurrency of dirty bitmap reading and writing can be ensured by using a dual-dirty bitmap reading and writing mechanism.

Figure 6:
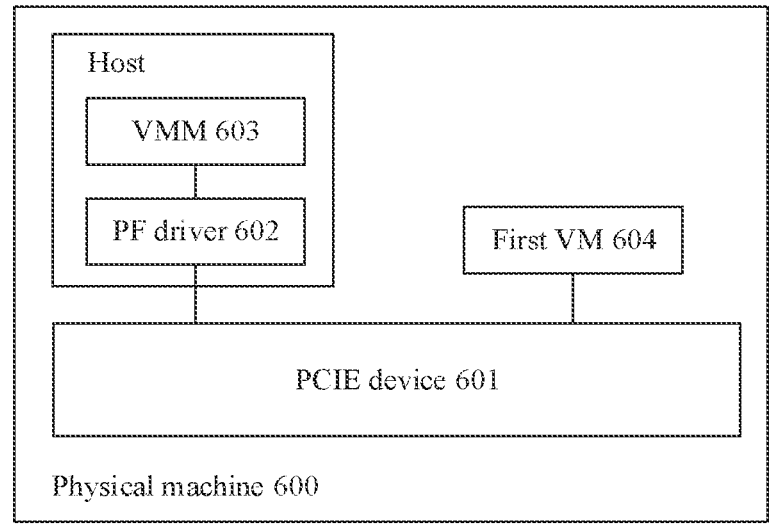
FIG. 6 is a schematic structural diagram of a physical machine according to an embodiment of this application.

FIG. 6 is a schematic structural diagram of a physical machine according to an embodiment of this application. As shown in FIG. 6, a peripheral component interconnect express PCIE device 601 is disposed on the physical machine 600, and at least one virtual machine VM including a first virtual machine VM 604, a physical function PF driver 602 configured to manage the PCIE device 601, and a virtual machine manager VMM 603 run in the physical machine 600.

In a live migration process of the first VM, the PCIE device 601 is configured to: receive a packet sent to the first VM, determine, based on the packet, a direct memory access DMA address corresponding to the first VM, and transfer the DMA address to the PF driver.

The PF driver 602 is configured to generate a dirty bit used to indicate the DMA address; and write the dirty bit into a dirty bitmap, so that the VMM 603 obtains the dirty bitmap, where the dirty bitmap is used to store an address of data that needs to be migrated in the live migration process of the first VM.

Optionally, in an embodiment, the PCIE device 601 is configured to:
write the DMA address into a buffer of a receive queue of the PF driver, and send a first interrupt to the PF driver, where the first interrupt is used to indicate the PF driver to read the buffer of the receive queue.

Optionally, in an embodiment, the PCIE device 601 is configured to:
write the DMA address into a mailbox, and send a second interrupt to the PF driver, where the second interrupt is used to indicate the PF driver to read the mailbox to obtain the DMA address.

Optionally, in an embodiment, the PCIE device 601 is configured to:
obtain, based on the packet, N DMA addresses from L DMA addresses corresponding to the first VM, where the L DMA addresses and the N DMA addresses belong to a same group of memory pages, and N is less than L; and
transfer the N DMA addresses to the PF driver.

Optionally, in an embodiment, the PCIE device 601 further includes at least one virtual function VF, in live migration of the first VM the first VM corresponds to a first VF in the at least one VF, and the PF driver is further configured to: send a function identifier of the first virtual function VF to the PCIE device; and
the PCIE device 601 is further configured to: determine the first VM based on the function identifier of the first VF.

Optionally, in an embodiment, the dirty bitmap includes a first dirty bitmap and a second dirty bitmap, the first dirty bitmap is writable, the second dirty bitmap is readable, and the PF driver 602 is configured to:
write the dirty bit into the first dirty bitmap; and
change the first dirty bitmap to readable, so that the VMM obtains the written dirty bit from the first dirty bitmap.

Optionally, in an embodiment, the PF driver 602 is further configured to: change the second dirty bitmap to writable, so that the PF driver writes information.

Optionally, in an embodiment, the PF driver 602 is further configured to: clear the first dirty bitmap.

Figure 7:
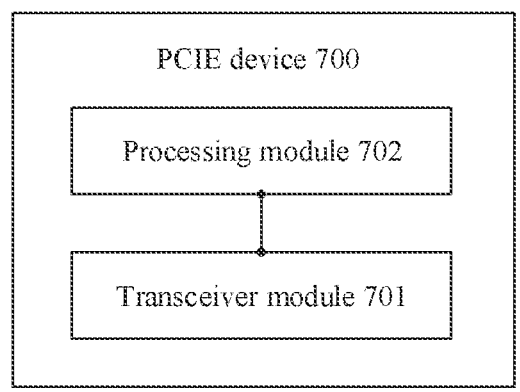
FIG. 7 is a schematic structural diagram of a peripheral component interconnect express PCIE device according to an embodiment of this application.

FIG. 7 is a schematic structural diagram of a peripheral component interconnect express PCIE device according to an embodiment of this application. As shown in FIG. 7, the PCIE device 700 is disposed on a physical machine, a host and at least one virtual machine VM including a first virtual machine VM run in the physical machine, the host includes a physical function PF driver configured to manage the PCIE device, and the PCIE device includes:
a transceiver module 701, configured to receive, in a live migration process of the first VM, a packet sent to the first VM; and
a processing module 702, configured to determine, based on the packet, a direct memory access DMA address corresponding to the first VM; and
the transceiver module 701 is further configured to transfer the DMA address to the PF driver for processing by the host.

Optionally, in an embodiment, the transceiver module 701 is configured to:
write the DMA address into a buffer of a receive queue of the PF driver; and
send a first interrupt to the PF driver, where the first interrupt is used to indicate the PF driver to receive the buffer of the receive queue.

Optionally, in an embodiment, the transceiver module 701 is configured to:
write the DMA address into a mailbox; and
send a second interrupt to the PF driver, where the second interrupt is used to indicate the PF driver to read the mailbox to obtain the DMA address.

Optionally, in an embodiment, the processing module 702 is further configured to: obtain, based on the packet, N DMA addresses from L DMA addresses corresponding to the first VM, where the L DMA addresses and the N DMA addresses belong to a same group of memory pages, and N is less than L; and
the transceiver module is configured to:
transfer the N DMA addresses to the PF driver.

Optionally, in an embodiment, the PCIE device 700 further includes at least one virtual function VF, in live migration of the first VM, the first VM corresponds to a first VF in the at least one VF, and the transceiver module 701 is further configured to; receive a function identifier, of the first VF, that is sent by the PF driver; and the processing module 702 is further configured to determine the first VM based on the function identifier of the first VF.

Figure 8:
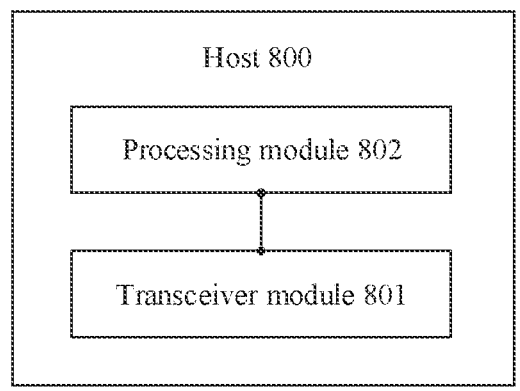
FIG. 8 is a schematic structural diagram of a host according to an embodiment of this application.

FIG. 8 is a schematic structural diagram of a host according to an embodiment of this application. As shown in FIG. 8, the host 800 runs in a physical machine, a peripheral component interconnect express PCIE device is disposed on the physical machine, and at least one virtual machine VM including a first virtual machine VM and a virtual machine manager VMM also run in the physical machine, and the host 800 includes:

a transceiver module 801, configured to receive, in a live migration process of the first VM, a DMA address transferred by the PCIE device, where the DMA address corresponds to the first VM; and generate a dirty bit used to indicate the DMA address; and a processing module 802, configured to write the dirty bit into a dirty bitmap, so that the VMM obtains the dirty bitmap, where the dirty bitmap is used to store an address of data that needs to be migrated in the live migration process of the first VM.

Optionally, in an embodiment, the transceiver module 801 is configured to: receive a first interrupt sent by the PCIE device, and read a buffer of a receive queue based on the first interrupt, where the DMA address is written into the buffer.

Optionally, in an embodiment, the transceiver module 801 is configured to: receive a second interrupt sent by the PCIE device, and read a mailbox based on the second interrupt to obtain the DMA address, where the DMA address is written into the mailbox.

Optionally, in an embodiment, the PCIE device 800 further includes at least one virtual function VF, in live migration of the first VM, the first VM corresponds to a first VF in the at least one VF, and the transceiver module 801 is further configured to: send a function identifier of the first virtual function VF to the PCIE device, so that the PCIE device determines the first VM based on the function identifier of the first VF.

Optionally, in an embodiment, the dirty bitmap includes a first dirty bitmap and a second dirty bitmap, the first dirty bitmap is writable, the second dirty bitmap is readable, and the processing module 802 is further configured to:

write the dirty bit into the first dirty bitmap, and change the first dirty bitmap to readable, so that the VMM obtains the written dirty bit from the first dirty bitmap.

Optionally, in an embodiment, the processing module 802 is further configured to: change the second dirty bitmap to writable, to write information.

Optionally, in an embodiment, the processing module 802 is further configured to; clear the first dirty bitmap.

Figure 9:
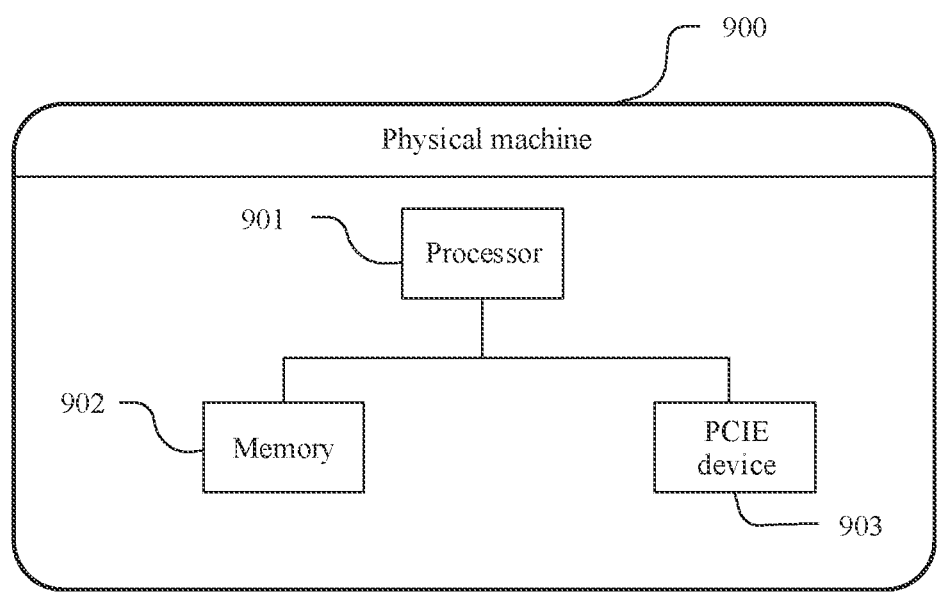
FIG. 9 is a schematic diagram of a physical machine according to an embodiment of this application.

FIG. 9 is a schematic diagram of an embodiment of a physical machine 900 according to an embodiment of this application. A specific device form of the physical machine 900 is not limited in this embodiment of this application.

The physical machine 900 may vary greatly with different configuration or performance, and may include one or more processors 901 and a memory 902. The memory 902 stores a program or data.

The memory 902 may be a volatile memory or a non-volatile memory. Optionally, the processor 901 is one or more central processing units (CPU). The CPU may be a single-core CPU or a multi-core CPU. The processor 901 may communicate with the memory 902, and execute, on the physical machine 900, a series of instructions in the memory 902.

The physical machine 900 further includes a PCIE device 903.

Optionally, although not shown in FIG. 9, the physical machine 900 may further include one or more power supplies and one or more input/output interfaces. The input/output interface may be configured to connect to a display, a mouse, a keyboard, a touchscreen device, a sensor device, or the like. The input/output interface is an optional component, and may exist or may not exist. This is not limited herein.

For procedures executed by the processor 901 and the PCIE device 903 in the physical machine 900 in this embodiment, refer to the method procedures described in the foregoing method embodiments. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for indicating a computer device (which may be a personal computer, a server, another network device) to perform all or some of the steps of the methods described in the embodiment in FIG. 2 of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An information processing method, wherein the information processing method is used in a physical machine, and wherein the method comprises:
   receiving, by a peripheral component interconnect express (PCIE) device in a live migration process of a first virtual machine (VM) migrating from a first host to a second host, a packet sent to the first VM, wherein the packet includes a destination address indicating the first VM, wherein the PCIE device and the first host are disposed on the physical machine, wherein a physical function (PF) driver managing the PCIE device and a virtual machine manager (VMM) managing the first VM run in the first host, and wherein the second host is disposed on the physical machine or another physical machine;
   determining, by the PCIE device based on the packet, a direct memory access (DMA) address corresponding to the first VM;
   transferring, by the PCIE device, the DMA address to the PF driver;
   generating, by the PF driver, a dirty bit used to indicate the DMA address; and
   writing, by the PF driver, the dirty bit into a dirty bitmap, so that the VMM obtains the dirty bitmap, wherein the dirty bitmap is used to store an address of data that needs to be migrated in the live migration process of the first VM.

2. The method according to claim 1, wherein transferring, by the PCIE device, the DMA address to the PF driver comprises:
   writing, by the PCIE device, the DMA address into a buffer of a receive queue of the PF driver; and
   sending, by the PCIE device, a first interrupt to the PF driver, wherein the first interrupt is used to indicate the PF driver to read the buffer of the receive queue.

3. The method according to claim 1, wherein transferring, by the PCIE device, the DMA address to the PF driver comprises:
   writing, by the PCIE device, the DMA address into a mailbox; and
   sending, by the PCIE device, a first interrupt to the PF driver, wherein the first interrupt is used to indicate the PF driver to read the mailbox to obtain the DMA address.

4. The method according to claim 1, wherein determining, by the PCIE device based on the packet, the DMA address corresponding to the first VM comprises:
   obtaining, by the PCIE device based on the packet, N DMA addresses from L DMA addresses corresponding to the first VM, wherein the L DMA addresses and the N DMA addresses belong to a same group of memory pages, and wherein N is less than L; and
   wherein transferring, by the PCIE device, the DMA address to the PF driver comprises:
   transferring, by the PCIE device, the N DMA addresses to the PF driver.

5. The method according to claim 1, wherein the dirty bitmap comprises a first dirty bitmap and a second dirty bitmap, wherein the first dirty bitmap is writable and the second dirty bitmap is readable, and wherein writing, by the PF driver, the dirty bit into the dirty bitmap comprises:
   writing, by the PF driver, the dirty bit into the first dirty bitmap; and
   changing, by the PF driver, the first dirty bitmap to readable, so that the VMM obtains the written dirty bit from the first dirty bitmap.

6. The method according to claim 5, wherein after changing, by the PF driver, the first dirty bitmap to readable, the method further comprises:
   changing, by the PF driver, the second dirty bitmap to writable, so that the PF driver writes information.

7. The method according to claim 5, wherein after the VMM obtains the written dirty bit from the first dirty bitmap, the method further comprises:
   clearing, by the PF driver, the first dirty bitmap.

8. An information processing method, wherein the information processing method is used in a peripheral component interconnect express (PCIE) device, and wherein the method comprises:
   receiving, in a live migration process of a first virtual machine (VM) migrating from a host to a second host, a packet sent to the first VM, wherein the packet includes a destination address indicating the first VM, wherein the PCIE device and the host are disposed on a physical machine, wherein a physical function (PF) driver managing the PCIE device and a virtual machine manager (VMM) managing the first VM run in the host, and wherein the second host is disposed on the physical machine or another physical machine;
   determining, based on the packet, a direct memory access (DMA) address corresponding to the first VM; and
   transferring the DMA address to the PF driver for processing by the host.

9. The method according to claim 8, wherein transferring the DMA address to the PF driver comprises:
   writing the DMA address into a buffer of a receive queue of the PF driver; and
   sending a first interrupt to the PF driver, wherein the first interrupt is used to indicate the PF driver to read the buffer of the receive queue.

10. The method according to claim 8, wherein transferring the DMA address to the PF driver comprises:
    writing the DMA address into a mailbox; and
    sending a first interrupt to the PF driver, wherein the first interrupt is used to indicate the PF driver to read the mailbox to obtain the DMA address.

11. The method according to claim 8, wherein determining, based on the packet, the DMA address corresponding to the first VM comprises:
    obtaining, based on the packet, N DMA addresses from L DMA addresses corresponding to the first VM, wherein the L DMA addresses and the N DMA addresses belong to a same group of memory pages, and wherein N is less than L; and
    wherein transferring the DMA address to the PF driver comprises:
    transferring the N DMA addresses to the PF driver.

12. A physical machine, wherein a peripheral component interconnect express (PCIE) device and a first host are disposed on the physical machine, and wherein:
in a live migration process of a first virtual machine (VM) migrating from the first host to a second host, the PCIE device is configured to:
receive a packet sent to the first VM, wherein the packet includes a destination address indicating the first VM, wherein a physical function (PF) driver managing the PCIE device and a virtual machine manager (VMM) managing the first VM run in the first host, and wherein the second host is disposed on the physical machine or another physical machine;
determine, based on the packet, a direct memory access (DMA) address corresponding to the first VM; and
transfer the DMA address to the PF driver; and
the PF driver is configured to:
generate a dirty bit used to indicate the DMA address; and
write the dirty bit into a dirty bitmap, so that the VMM obtains the dirty bitmap, wherein the dirty bitmap is used to store an address of data that needs to be migrated in the live migration process of the first VM.

13. The physical machine according to claim 12, wherein the PCIE device is configured to:
write the DMA address into a buffer of a receive queue of the PF driver; and
send a first interrupt to the PF driver, wherein the first interrupt is used to indicate the PF driver to read the buffer of the receive queue.

14. The physical machine according to claim 12, wherein the PCIE device is configured to:
write the DMA address into a mailbox; and
send a first interrupt to the PF driver, wherein the first interrupt is used to indicate the PF driver to read the mailbox to obtain the DMA address.

15. The physical machine according to claim 12, wherein the PCIE device is configured to:
obtain, based on the packet, N DMA addresses from L DMA addresses corresponding to the first VM, wherein the L DMA addresses and the N DMA addresses belong to a same group of memory pages, and wherein N is less than L; and
transfer the N DMA addresses to the PF driver.

16. The physical machine according to claim 12, wherein the dirty bitmap comprises a first dirty bitmap and a second dirty bitmap, wherein the first dirty bitmap is writable and the second dirty bitmap is readable, and wherein the PF driver is configured to:
write the dirty bit into the first dirty bitmap; and
change the first dirty bitmap to readable, so that the VMM obtains the written dirty bit from the first dirty bitmap.

17. The physical machine according to claim 16, wherein the PF driver is further configured to change the second dirty bitmap to writable, so that the PF driver writes information.

18. A peripheral component interconnect express (PCIE) device, wherein the PCIE device is configured to perform operations comprising:
receiving, in a live migration process of a first virtual machine (VM) migrating from a host to a second host, a packet sent to the first VM, wherein the packet includes a destination address indicating the first VM, wherein the PCIE device and the host are disposed on a physical machine, wherein a physical function (PF) driver managing the PCIE device and a virtual machine manager (VMM) managing the first VM run in the host, and wherein the second host is disposed on the physical machine or another physical machine;
determining, based on the packet, a direct memory access (DMA) address corresponding to the first VM; and
transferring the DMA address to the PF driver for processing by the host.

19. The PCIE device according to claim 18, wherein transferring the DMA address to the PF driver comprises:
writing the DMA address into a buffer of a receive queue of the PF driver; and
sending a first interrupt to the PF driver, wherein the first interrupt is used to indicate the PF driver to read the buffer of the receive queue.

20. The PCIE device according to claim 18, wherein transferring the DMA address to the PF driver comprises:
writing the DMA address into a mailbox; and
sending a first interrupt to the PF driver, wherein the first interrupt is used to indicate the PF driver to read the mailbox to obtain the DMA address.

* * * * *